United States Patent

Dransfield et al.

[15] 3,676,876

[45] July 11, 1972

[54] METER READING UNITS

[72] Inventors: Desmond Dransfield; Patrick Bass; Roy Ernest White; Leslie Thomas Bracker, all of London, England

[73] Assignee: United Gas Industries Limited, London, England

[22] Filed: Feb. 26, 1971

[21] Appl. No.: 119,364

Related U.S. Application Data

[63] Continuation of Ser. No. 688,759, Dec. 7, 1969, abandoned.

[52] U.S. Cl. .......................................... 340/188, 324/99 D
[51] Int. Cl. .................................. G08c 09/00, G01r 17/06
[58] Field of Search ............... 340/188, 347 P; 324/99 D; 235/92

[56] References Cited

UNITED STATES PATENTS

| | | | |
|---|---|---|---|
| 3,069,670 | 12/1962 | Rondeau et al. | 340/188 |
| 3,047,662 | 7/1962 | Smith | 340/151 X |
| 3,376,389 | 4/1968 | Fair | 340/151 X |
| 3,376,567 | 4/1968 | Brothman et al. | 340/188 |
| 3,072,888 | 1/1963 | Booker, Jr. | 235/92 Q |
| 3,124,794 | 3/1964 | Patmore | 235/92 |

FOREIGN PATENTS OR APPLICATIONS 918,415  2/1963  Great Britain ......................324/99 D Primary Examiner—Donald J. Yusko
Attorney—Cushman, Darby & Cushman

[57] ABSTRACT

A meter reading unit by means of which a reading may be made without sight of a meter includes a plurality of indicators, one corresponding to each digit of the meter reading, a switch associated with each indicator, and electrical connections provided for connection to switches at a meter which are set according to the meter reading whereby particular ones of the electrical connections are made according to the setting of the switches at the meter, and means to set the indicators according to the setting of the switches at the meter.

7 Claims, 5 Drawing Figures

Patented July 11, 1972

METER READING UNITS

This application is a continuation of Ser. No. 688,759 filed Dec. 7, 1969 and now abandoned.

This invention relates to a meter reading unit by means of which a reading may be taken without actual sight of the index or register of the meter and a meter reader does not require to gain entry to the premises in which a meter is installed. The unit may be used with meters measuring the supply of gas, electricity or liquids, whether the meter is already in existence or is a meter constructed specially for the purpose of the invention.

According to the present invention there is provided a unit for use in reading a meter, from which meter there may be provided particular electrical connections according to the meter reading, the unit including a plurality of indicators, one for each digit of the meter reading, conductors for coupling an indicator to the said electrical connections at the meter, means for setting each of the indicators, and means for determining when the setting of an indicator corresponds to a particular electrical connection at the meter.

In a simple embodiment of the invention the meter reading unit may include a series of rotary switch arms, having pointers indicating numbers and each corresponding to a respective digit wheel of the meter index or register. Each digit wheel carries ten numbers and there is a moving contact on each digit wheel co-operating with a fixed contact for each number on the wheel. The rotary switch arms of the meter reader's unit are coupled to the respective moving contacts of the digit wheels and the fixed contacts, associated with the rotary switches of the reader's unit, are each connected independently to a corresponding fixed contact associated with a digit wheel. By providing a lamp and a source of power in series with each rotary switch moving contact it is possible to rotate the rotary switch until its associated lamp glows, thus indicating that the position of the rotary switch corresponds with the position of the associated digit wheel.

Modifications of this arrangement are, of course, possible, for example, the power may be supplied via a single source through a selector switch to each rotary switch in turn, and there may be a single lamp connected in series with the moving contact of the selector switch.

It is also possible for the unit to provide a permanent record of the reading, for example by means of a paper tape, that is fed forward according to the angle of rotation of a first rotary switch until the lamp glows, when a hole is automatically punched in the tape. The tape is then fed forward according to the rotation of the next rotary switch until the lamp glows and a further hole is punched in the tape. The number of spaces between the holes is thus clearly representative of a digit wheel setting. The tape could of course be a magnetic tape fed forward according to the rotation of the rotary switches. The tape, whether for punching, magnetic or other marking may be scaled according to the representations of the numbers. The tape may be located at a zero position before being fed forward and it may be fed forward automatically at a speed corresponding to the speed of rotation of rotary switches.

In another embodiment of the invention it is possible to obtain an analogue of the digit wheel positions on voltmeters, and in yet a further embodiment the use of transistor circuitry and electromechanically operated counters provide a means of obtaining a rapid and automatic display of the meter reading.

Embodiments of the invention will now be described with reference to the accompanying drawings, in which.

Figure 1:
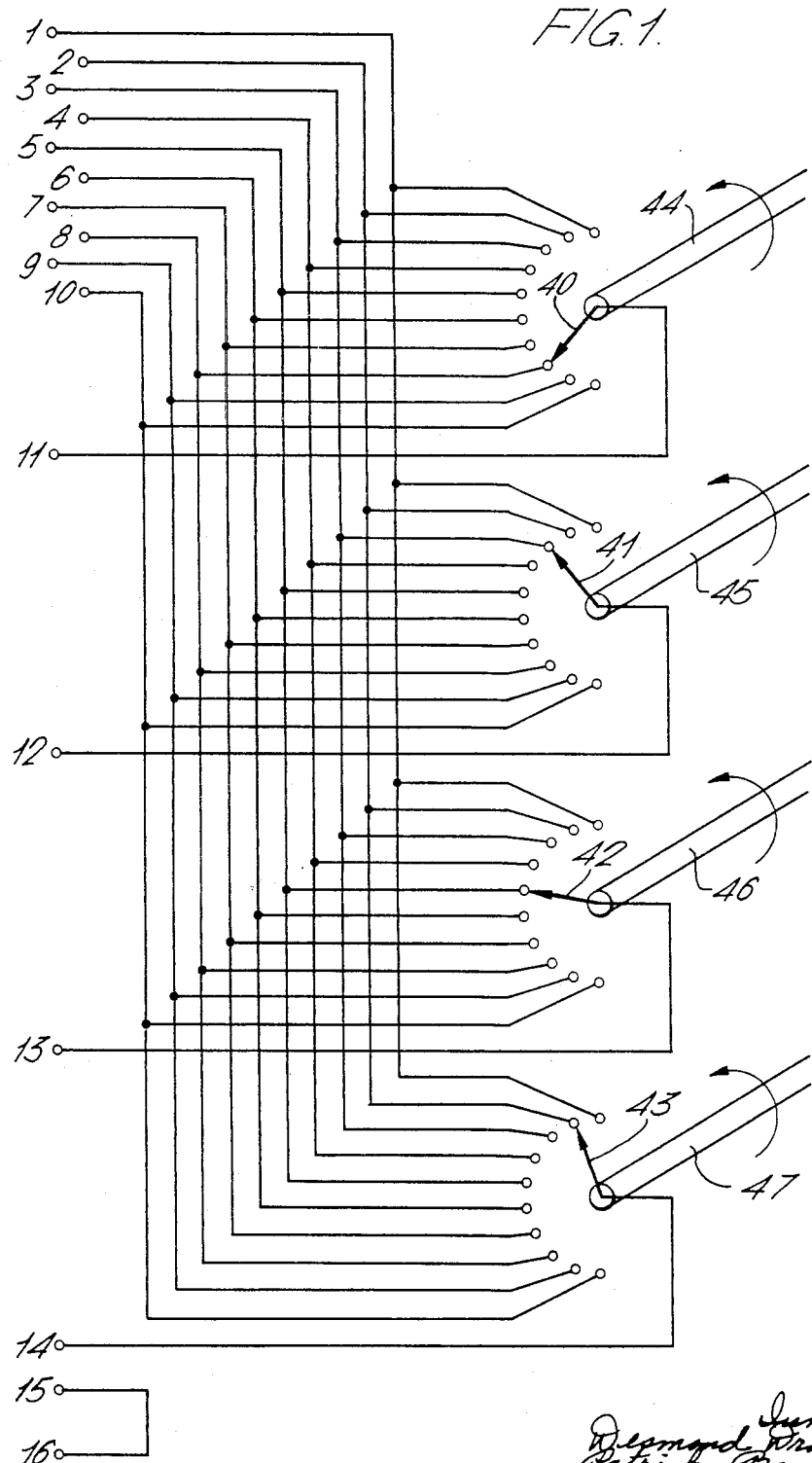
FIG. 1 shows a schematic diagram of electrical connections at a meter.

Referring to FIG. 1 there are shown a number of switches associated with a meter and having rotatable contacts 40 to 43 which are coupled to shafts 44 to 47 forming extensions of respective shafts of digit wheels in a meter index or register. Each of the rotatable contacts co-operates with a set of fixed contacts connected to terminals 1 to 10 of a terminal block. The rotatable contacts 40 to 43 are connected to terminals 11 to 14 respectively and terminals 15 and 16 on the terminal block are strapped together. The block terminal is arranged on the outside of a subscriber's house and it provides sockets into which a plug connected to a meter reader's unit may be inserted.

Figure 2:
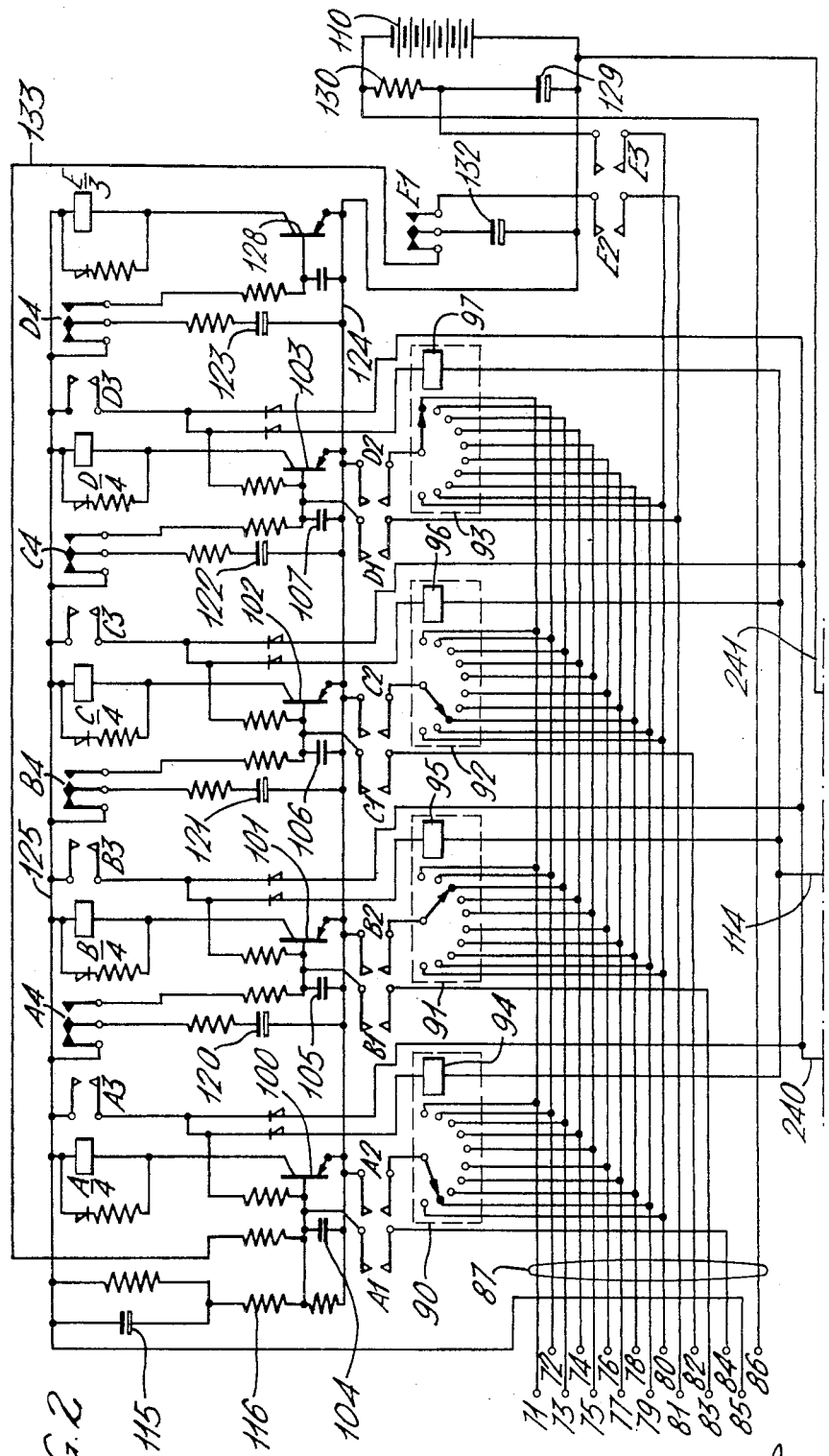
FIG. 2 shows a part of a circuit diagram for another form of meter reader's unit.
Figure 3:
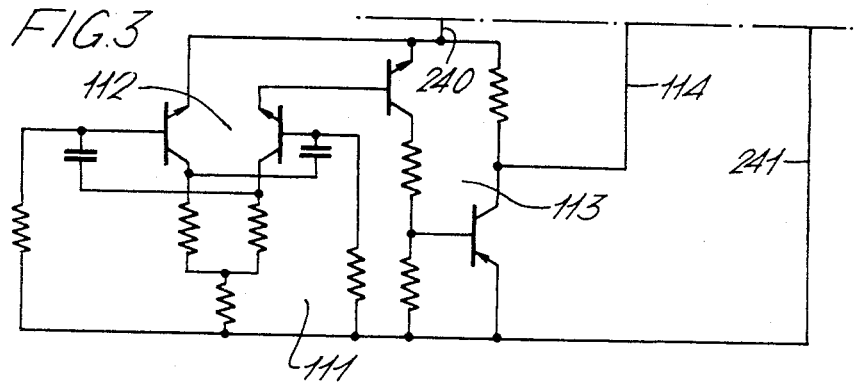
FIG. 3 shows the remainder of the circuit illustrated in FIG. 2.

Referring to FIGS. 2 and 3 there is shown a circuit diagram of a transistorized electromechanical meter reader's unit which includes a plug having connection pins 71 to 86 which are connected via a flexible cable 87 to the remainder of the circuit.

The pins 71 to 80 are connected to the fixed contacts of four electromechanically operated numeral indicating switches 90 to 93 which have operating coils 94 to 97 respectively. The moving contacts of the switches 90 to 93 are connected in series with the operating coils of relays A/4, B/4, C/4 and D/4 respectively via the emitter-collector circuits of transistors 100, 101, 102 and 103, and operated contacts A2, B2, C2 and D2 of the said relays. The pins 84, 83, 82 and 81 of the plug are connected respectively via operated contacts A1, B1, C1 and D1 of the relays to the bases of the transistors and capacitors 104, 105, 106 and 107 having a value of 2200 pF each are connected across the base and emitter of the transistors 100, 101, 102 and 103 respectively. Contacts A3, B3, C3 and D3 of the relays are arranged to connect the voltage from a battery 110 to a pulse generator 111, which includes a multivibrator 112 and an output stage 113, and to provide a connection for an output from the pulse generator via a lead 114 to a respective one of the operating coils 94 to 97 of the numeral indicator switches 90 to 93. The moving contacts of the switches 90 to 93 are mechanically coupled to numeral indicator wheels so that a number on a wheel is visible according to the position of a moving contact. The terminal pin 85 is connected via a 50$\mu$F capacitor 115 and a 100 ohm resistor 116 to the base of the transistor 100, and the terminal pin 86 is connected to one terminal of the battery 110. Changeover contacts A4, B4, C4 and D4 of the relays are connected so that in their operated conditions respective 25$\mu$F capacitors 120, 121, 122 and 123 are connected between the positive and negative power supply lines 124 and 125. In the unoperated condition of the relays A/4, B/4, and C/4 the contacts A4, B4 and C4 connect the capacitors 120, 121 and 122 to the bases of the transistors 101, 102 and 103 respectively, while in the unoperated condition of the relay D/4 the contacts D4 connect the capacitor 123 to a transistor 128 which has, in its collector circuit, a relay E/3. A capacitor 129 of 15$\mu$F, which is connected via a resistor 130 of 1 M$\Omega$ across the battery 110, is also connected via an operated contact E3 of the relay E/3 to the terminal 80, and the terminal 81 is connected via an operated contact E2, and the changeover contact of the relay contacts E1 to a capacitor 132 of 100$\mu$F. The normally made contacts E1 connect the capacitor 132 to the base of the transistor 100 via a lead 133.

In operation the connection of the plug terminal to a subscriber's socket causes the loop on the socket terminals 15 and 16 (FIG. 1) to be connected between pins 85 and 86 of the plug and the negative terminal of the battery 110 to be connected via the capacitor 115 and the resistor 116 to the base of the transistor 110, thereby injecting a negative going pulse into the base of the transistor 100 causing the transistor 100 to conduct. This results in the relay A/4 being operated via the emitter-collector circuit of the transistor 100. The relay A/4 is held via its contact A3. At the same time the operation of the contact A3 completes the battery supply circuit for the pulse generator 111 and the operating circuit for the operating coil 94 of the numeral indicator switch 90. The output from the generator 111 applied to the coil 94 via the lead 114 causes the moving contact of the switch 90 to step until it reaches a fixed contact which is connected to a fixed contact of the associated meter register wheel upon which the moving contact of the register wheel is resting. When this position is reached there is provided a loop connection via the moving contact of the switch 90, the relay contacts A1 and A2, the emitter-base connection of the transistor 100, the pin 84, the socket 14, the moving contact 43, its associated fixed contact and the appropriate fixed contact of the switch 90. This loop short circuits the capacitor 104 causing it to be discharged and the transistor 100 to be cut-off. This results in the release of the relay A/4 and the change over of the contacts A4, thereby causing the capacitor 120, which has been charged through the contacts A4 in their operated state, to be discharged to the base of the transistor 101.

The steps which have been described with reference to the circuit including the transistor 100, the switch 90 and the relay A are now repeated for each digit in turn by the corresponding succeeding circuits until the movable contact of each switch has been stepped to a position corresponding to the position of its associated meter index or register, and a number on a numeral wheel in the unit and associated with it has been rotated to a position determined by the position of its meter register wheel. When the moving contact of the switch 93 has finished stepping and the relay D/4 has been released a signal pulse is transferred from the capacitor 123 to the base of a transistor 128 via the contacts D4 in the released position and the transistor 128 is caused to conduct. This results in the momentary operation of the relay E and contacts E2 and E3 make and the contact E1 changes over. This momentary operation of the relay E is used in making a test on the last and least significant digit which is registered on the switches associated with the meter. When the last significant digit on the register in the subscriber's house is at zero the moving contact 40, (FIG. 1) associated with the register wheel, is on the contact connected to the terminal 10 on the outside of the subscriber's house.

In this situation it is possible for there to have been a change in the meter reading while the reading was being taken by the reader's unit and for this change to be significant. For example, if, at the start of the reading process the meter reading was 2999 and, after the first and most significant digit had been read, the reading increased by only one unit of the least significant digit, the reading at the meter, due to the mechanical coupling of its cyclometer type register would change to 3000, but the reader's unit would register 2000 because the first digit had already been recorded. Other mixed readings which might be obtained according to the instant when a change occurred, for example, are 2900 or 2990. To safeguard against an error due to this condition the short circuit connection between the terminals 10 and 11 (FIG. 1), which is completed via the contact 40, when the least significant digit at the meter is zero, is applied via the terminals 80 and 81, and the relay contacts E2, E3 to connect the capacitor 129 in parallel with the capacitor 132. The charge that has slowly leaked into the capacitor 129 via the resistor 130 is now shared between the two capacitors. Since the capacitor 132 is much larger than the capacitor 129, the voltage on the capacitor 129 will fall well below half of its former value. On the release of the relay E/3, the change over contacts E1 will discharge the capacitor 132 into the base of the transistor 100. This will reoperate the relay A/4 and start a repeat cycle of events. Due however to the fact that the capacitor 129 is slow to charge, it will not accumulate sufficient charge to recycle more than once, the meter reading cycle taking considerably less time than the the charging of the capacitor 129 via the resistor 130. Of course, it is possible to reduce the value of the resistor 130 so that the circuit may be recycled as long as the plug is connected to the socket on the subscriber's premises.

Furthermore the circuit may be constructed with fewer mechanical components, for example the relays and the decade switches may be replaced with solid state switching devices and the reliability of the arrangement may thereby be increased.

Figure 4:
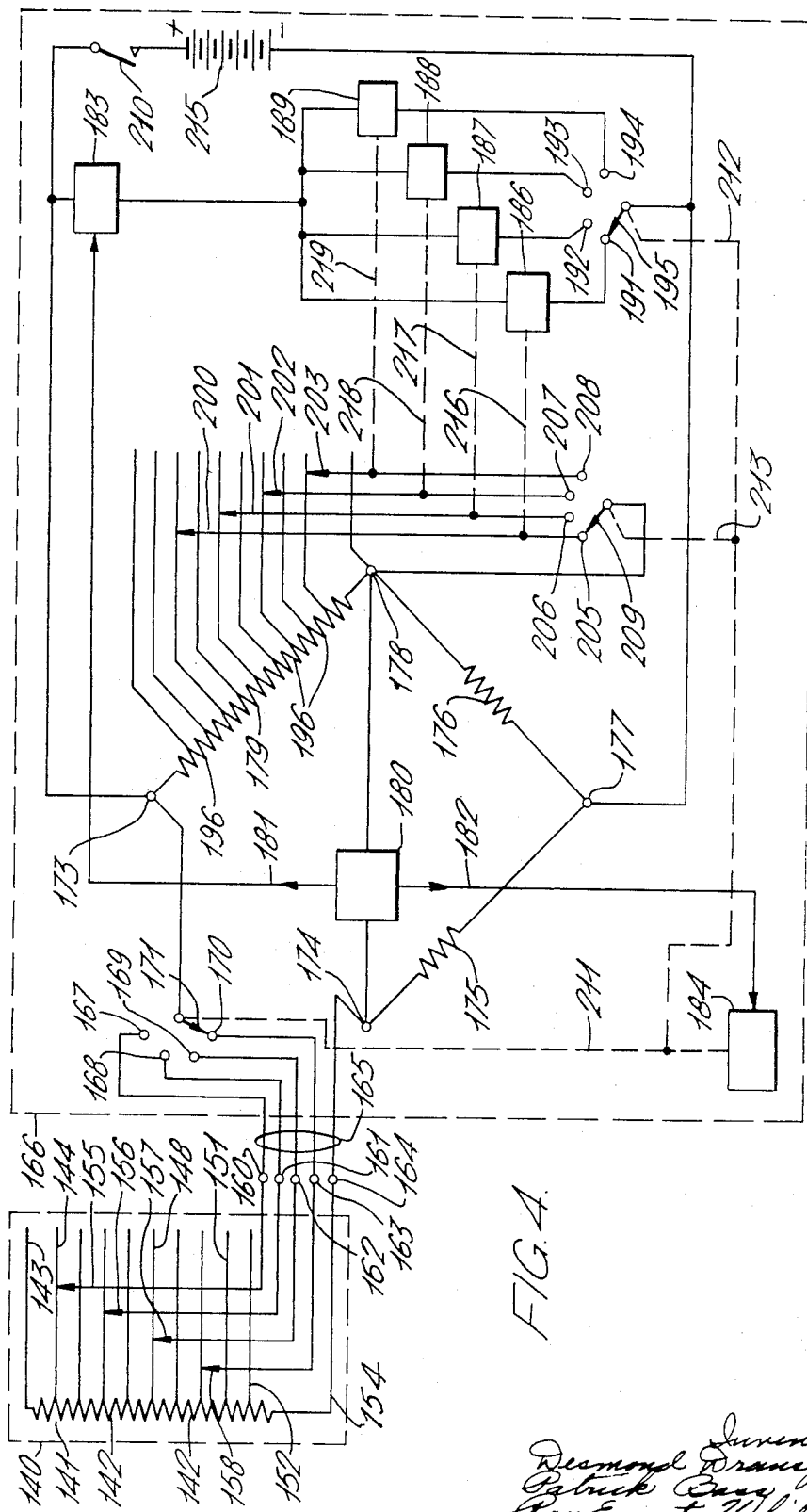
FIG. 4 shows, in block schematic form, an arrangement illustrating the basic principle of a further arrangement.

An arrangement requiring fewer connection leads between the attachment at the meter and the meter reader's unit will now be described with reference to FIG. 4 which shows diagrammatically a meter 140 including an attachment having a voltage divider 141 which includes a series of resistors 142 which may be of equal value. The junctions between the resistors are connected by ten leads to ten corresponding fixed contacts (not shown of four rotary switches each associated with a particular digit wheel of the meter index or register and similar to those shown in FIG. 1. One end of the divider is connected to a common lead 164. The four moving contacts 155, 156, 157 and 158 of the rotary switches, similar to contacts 40, 41, 42 and 43 shown in FIG. 1, are coupled, as mentioned above, to respective register index wheels, and are indicated diagrammatically in positions to scan the leads 143 to 152 connected to the fixed contacts on the switches. The lead 152 is connected to the zero contacts of the switches and the lead 143 is connected to the contact corresponding to the digit 9. The rotary contacts 155 to 158 are connected to terminals 160 to 163 in a terminal block on the outside of a house and the common lead 154 is connected to a terminal 164 on the terminal block. A plug connected to a flexible cable 165 is coupled at one end to the block terminal and at the other end to a meter reader's unit 166. The terminals 160 to 163 are thus connected to four fixed contacts 167, 168, 169 and 170 of a rotary switch, the moving contact 171 of which is connected to a junction 173 of the arms of a Wheatstone bridge. The common lead connected to the terminal 164 is connected to a junction 174 of the arms of the bridge. The arm connected between the junctions 173 and 174 provides unknown resistance and the ratio arms of the bridge are provided by the resistors 175 and 176 connected between junctions 174 and 177, and 177 and 178 respectively. Between the junctions 173 and 178 there is connected the measuring arm 179. An indicator 180 is connected between the junctions 174 and 178. The indicator 180 is of a type which provides a signal output on the lead 181 only when the bridge is out of balance and a signal output on a lead 182 only when the bridge is in balance. The lead 181 is connected to a pulse generator 183 and the out of balance signal on the lead 181 acts as a gating pulse for the generator 183. The lead 182 is connected to a drive circuit 184 for the rotary contacts of a number of switches so that the switches are stepped when a balance of the bridge circuit is obtained. The output of the pulse generator 183 is connected to four numeral indicating counters 186, 187, 188 and 189 each of which is connected to a respective fixed contact 191, 192, 193 and 194 of a rotary switch having a moving contact 195 connected to the junction 177 of the bridge.

The arm 179 of the bridge is composed of a number of fixed resistors 196 connected in series and equal in value and number to the resistors 142 in the meter.

The counters 186, 187, 188 and 189 each have a respective moving contact indicated diagrammatically at 200, 201, 202 and 203 arranged to scan ten fixed contacts connected, as shown, diagrammatically to the junctions between the resistors 196. The couplings between the counters and the moving contacts are illustrated diagrammatically by the dotted lines 216 to 219. The moving contacts 200 to 203 are connected to respective fixed contacts 205, 206, 207 and 208 of a rotary switch, the moving contact 209 of which is connected to the junction 178 of the bridge. The moving contacts 171, 195 and 209 are driven by electro-mechanical means coupled to the drive circuit 184 as indicated by the dotted lines 211, 212 and 213.

The moving contact 171 selects a particular one of the moving contacts 155 to 158 in the meter and therefore a particular one of the switches associated with a digit wheel of the meter index or register. At the same time the moving contacts 195 and 209 select a corresponding numeral indicating counter and its associated moving contact so that it may be arranged to scan the appropriate counter for the digit of the meter being read at any given time. The meter reader's unit is powered by a battery 215 connected via a switch 210.

In operation when the plug on the lead 165 is connected to the terminals 160 and 164 and the switch 210 on the unit is operated, assuming that the moving contacts 171, 209, and 195 are on the fixed contacts 170, 205 and 191 as shown, the moving contact 158 of one switch associated with a meter index digit wheel will be in contact with a particular lead 143 to 152 according to the reading of the meter and a particular value of resistance will therefore be connected in the unknown arm of the bridge between the junctions 173 and 174. If the moving contact 200 is not in contact with a lead connected to a junction between a pair of resistors 196 such that the effective resistance in the arm 179 results in the bridge being balanced, an output is obtained from the detector 180 on the lead 181 to the pulse generator 183, resulting in a pulse being transmitted from the generator to the counter 186, which causes the counter 186 to step the moving contact 200 so that it is in contact with the next lead connected to a junction between the resistors 196, and this process is continued until the bridge is balanced. At this point the number indicating wheel will indicate the same value as the corresponding meter register wheel, and no further output is obtained on the lead 181. However when balance is reached an output from the detector 180 is applied to the drive circuit 184 and the moving contacts 171, 195 and 209 are stepped into contact with respective fixed contacts 169, 192 and 206. The process of driving the counter 187 then proceeds until the bridge is balanced again and the counters 188 and 189 are then driven in succession until the reading at the meter is displayed on the indicating wheels associated with the counters 186 to 189. It may, of course, be arranged that the stepping of the moving contacts 171, 195 and 209 is performed a second time or even continuously in order to check the display of each digit.

Figure 5:
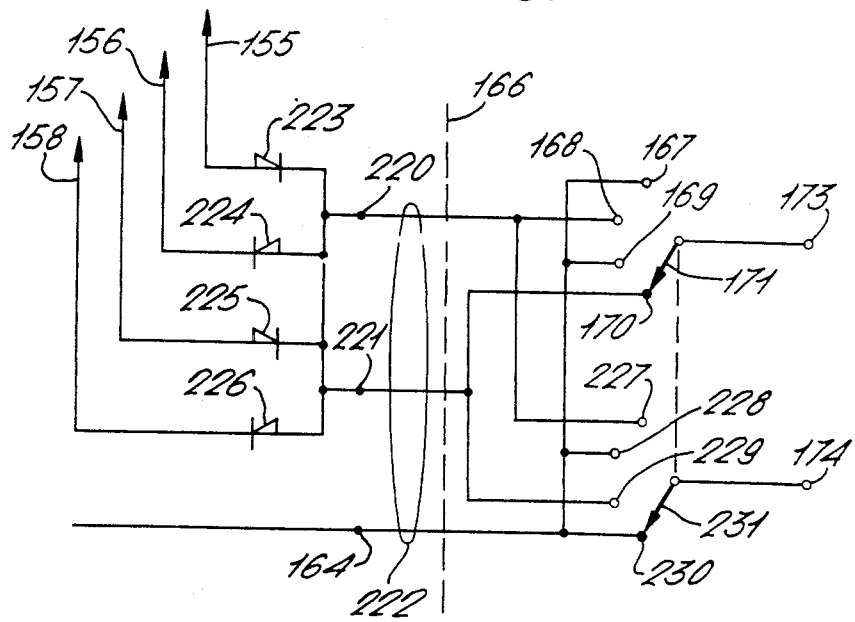
FIG. 5 shows a circuit detail of a modification of a part of the circuit shown in FIG. 4.

Referring to FIG. 5 there is shown a modification of a part of the circuit by means of which the number of leads in the coupling cable 165 is reduced to three as indicated by the cable 222. In FIG. 5 the moving contacts 155, 156, 157 and 158 in the meter are connected via four rectifiers 223, 224, 225 and 226 to two terminals 220 and 221. By means of an extra four position switch, having a moving contact 231, in the reader's unit coupled to the three existing switches, polarity reversal takes place on alternate contacts thus providing the required distinct circuit connections between the meter and the reader's unit using only the common lead connected to the terminal 164 and the two leads connected to the terminals 220 and 221.

It is, of course, also possible by using an A.C. bridge with a source of different frequencies for each of the digit wheels and similarly four tuned circuits in place of each of the rectifiers 223, 224, 225 and 226, to effectively join the terminals 220 and 221 together and to use only two leads, including that connected to terminal 164, in the cable 222 instead of three.

We claim:

1. A unit for use in reading a meter, from which meter there may be provided particular electrical connections according to the meter reading, the unit including a plurality of electromechanically operated indicators which are operable serially, one indicator for each digit of the meter reading, conductors for coupling an indictor to the said electrical connections at the meter, means for setting each of the indicators and a rotary switch associated with each of the indicators and means for determining when the setting of an indicator corresponds to a particular connection at the meter; the means for setting each of the indicators including a first switch having first contacts, a transistor associated with each indicator, the first switch being operated via the transistor, a pulse generator, the output of which is connected via a respective first contacts when operated to cause the operation of its associated indicator, an input by means of which a signal may be applied to cause the transistor associated with an indicator to conduct, the corresponding fixed contacts of the rotary switches being connected in common to one of the possible particular electrical connections and the moving contact of each rotary switch being connected via the emitter-base connection of its respective transistor to a conductor associated with a particular digit, whereby a connection may be provided via the moving contact of each rotary switch, the said emitter-base connection of the respective transistor and a corresponding digit reading switch at a meter, whereby when such a connection is made, the transistor is caused to change its state and the first contacts are opened thereby disconnecting the supply of pulses from the generator to the indicator.

2. A unit as claimed in claim 1 in which there is provided a first capacitor connected across the emitter-base connection of each transistor and in which, when the said connection via the digit reading switch is made the said capacitor is discharged and its associated transistor is cut off.

3. A unit as claimed in claim 2, including a second capacitor associated with each indicator in which the first switch has second contacts which operate upon the change of state of the transistor to connect the second capacitor to cause the operation of the succeeding one of the plurality of indicators.

4. A unit as claimed in claim 3, including means to test if the last digit is a zero, and means, in the event that the last digit is a zero, to supply a signal to the input to cause the indicators to be reoperated.

5. A unit as claimed in claim 4, in which the means to test if the last digit is a zero includes a further relay operated momentarily by the discharge of the second capacitor associated with the last indicator in the series, a third capacitor and a further, normally charged, capacitor arranged to be connected via a connection at a meter and the operated contacts of the further relay to charge the third capacitor.

6. A unit as claimed in claim 5, in which the signal applied to the input, in the event that the last digit is a zero, is applied from the third capacitor via contacts of the further relay when released.

7. A unit for use in reading a meter, from which meter there may be provided particular electrical connections according to the meter reading, the unit including a plurality of electromechanically operated indicators which are openable serially, one indicator for each digit of the meter reading, conductors for coupling an indicator to the said electrical connections at the meter, means for setting each of the indicators and a rotary switch associated with each of the indicators and means for determining when the setting of an indicator corresponds to a particular connection at the meter; the means for setting each of the indicators including for each indicator a first switch having first contacts, a second switching device, means for operating said first switch operated via connections of the second switching device, an electrical power source the output of which is connected via the first contacts when conducting to cause the operation of the associated indicator, an input by means of which a signal may be applied to cause connections of the second switching device to conduct; the corresponding fixed contacts of the rotary switches being connected in common to one of the possible electrical connections and the moving contact of each rotary switch, connections of said second switching device and a corresponding digit reading switch at a meter, whereby when such path is made said second switching device is caused to change over and the first contacts are opened thereby disconnecting the electrical power source from the indicator.

* * * * *